United States Patent
Kaufman et al.

(10) Patent No.: US 9,160,726 B1
(45) Date of Patent: Oct. 13, 2015

(54) AUTHENTICATION SYSTEM WITH SELECTIVE AUTHENTICATION METHOD BASED ON RISK REASONING

(71) Applicant: EMC Corporation, Hopkinton, MA (US)

(72) Inventors: Alon Kaufman, Bnei Dror (IL); Marcelo Blatt, Modiin (IL); Alex Vaystikh, Hod Hasharon (IL); Triinu Magi Shaashua, Herzeliya (IL); Yael Villa, Tel Aviv (IL)

(73) Assignee: EMC Corporation, Hopkinton, MA (US)

( * ) Notice: Subject to any disclaimer, the term of this patent is extended or adjusted under 35 U.S.C. 154(b) by 34 days.

(21) Appl. No.: 13/931,151

(22) Filed: Jun. 28, 2013

(51) Int. Cl.
*G06F 17/30* (2006.01)
*H04L 29/06* (2006.01)

(52) U.S. Cl.
CPC .................................... *H04L 63/08* (2013.01)

(58) Field of Classification Search
CPC ... G06F 21/31; G06F 21/608; G06F 21/6218; G06F 2221/2141; G06F 21/445; G06F 21/10; G06F 21/335; G06F 21/43; G06F 21/604; G06F 21/606; G06F 21/6209; G06F 21/6245; G06F 21/629; G06F 2211/008; H04L 63/08; H04L 9/3271; H04L 2209/80; H04L 2209/56; H04L 63/10; H04L 63/12; H04L 9/3263; H04L 2209/34; H04L 2209/60; H04L 29/06027; H04L 63/02; H04L 63/0281; H04L 63/0823; H04L 63/0853; H04L 63/0869; H04L 9/00; H04L 9/32; H04L 9/3213; H04L 9/3247; H04N 2007/1739; H04N 21/234363; H04N 21/235; H04N 21/4122; H04N 21/4223; H04N 21/4316; H04N 21/435; H04N 21/43632; H04N 21/4622; H04N 21/478; H04N 21/4782; H04N 21/4886; H04N 21/6377; H04W 12/06
USPC .................................. 726/2, 6, 22, 7; 713/171
See application file for complete search history.

(56) References Cited

U.S. PATENT DOCUMENTS

| | | | |
|---|---|---|---|
| 8,806,591 B2* | 8/2014 | Dallas et al. ....................... | 726/6 |
| 8,935,769 B2* | 1/2015 | Hessler ............................... | 726/7 |
| 2009/0158390 A1* | 6/2009 | Guan ................................. | 726/2 |

OTHER PUBLICATIONS

RSA, Risk-Based Authentication—RSA risk engine—EMC, http://www.emc.com/security/rsa-securid/rsa-risk-based-authentication.htm, 2013.
RSA, Adaptive Authentication, A Comprehensive Authentication & Fraud Detection Platform, EMC, 2013.

* cited by examiner

*Primary Examiner* — Thanhnga B Truong
(74) *Attorney, Agent, or Firm* — Ryan, Mason & Lewis, LLP

(57) ABSTRACT

Authentication systems are provided that select an authentication method to be applied to a given transaction from among a plurality of available authentication methods based on risk reasoning. An authentication request from an authentication requestor for a given transaction is processed by receiving the authentication request from the authentication requester and selecting an authentication method to be applied to the given transaction from among a plurality of available authentication methods based on an evaluation of one or more predefined risk reasons with respect to the available authentication methods. The predefined risk reasons associated with a given transaction comprise, for example, a set of risk reasons that contribute to a risk score that has been assigned to the given transaction. The evaluation may employ one or more of rule-based, heuristic and Bayesian techniques.

20 Claims, 4 Drawing Sheets

AUTHENTICATION SYSTEM WITH SELECTIVE AUTHENTICATION METHOD BASED ON RISK REASONING

FIELD OF THE INVENTION

The present invention relates generally to techniques for detecting fraud in network communication systems.

BACKGROUND OF THE INVENTION

Authentication systems aim to identify fraudulent users even though such users possess credentials to gain access to a legitimate user's account information. For example, each login attempt is received at a service provider at a particular time and in many cases, a fraudulent user will send login attempts at times outside of those expected by a service provider. Existing adaptive authentication techniques compare information associated with a login attempt, such as the time of the login and a location from where the login originated, with a historical record of a typical user who exhibits some expected login behavior. For example, if a high percentage of prior login attempts received by the service provider from a particular user occur between the hours of 6 AM and 11 PM daily and from locations within the continental United States, then login attempts between 2 AM and 4 AM from locations across Eastern Europe, have a high risk of being a fraudulent user.

The need for improved and comprehensive authentication systems is rising every day, for example, due to the increase in cybercrime and fraud. Many adaptive authentication systems employ a number of different authentication methods. Authentication methods include, for example, simple passwords, one-time passcodes, biometrics, tokens and certificates. Each authentication method varies by the strength of the method, the addressed authentication factors, and the usability and cost of the method. Existing authentication systems select one or more suitable authentication methods based on the sensitivity and risk of the activity, taking into account usability and cost constraints.

A need remains for improved techniques for selecting a suitable authentication method for a given transaction from among a plurality of available authentication methods based on attributes of the available authentication methods and the context of the activity demanding the authentication.

SUMMARY OF THE INVENTION

The present invention in the illustrative embodiments described herein provides authentication systems that select an authentication method to be applied to a given transaction from among a plurality of available authentication methods based on risk reasoning. In accordance with an aspect of the invention, an authentication request from an authentication requestor for a given transaction is processed by receiving the authentication request from the authentication requester and selecting an authentication method to be applied to the given transaction from among a plurality of available authentication methods based on an evaluation of one or more predefined risk reasons with respect to the available authentication methods. The predefined risk reasons associated with a given transaction comprise, for example, a set of risk reasons that contribute to a risk score that has been assigned to the given transaction. Generally, the predefined risk reasons indicate whether a device associated with the given transaction is compromised.

In one embodiment, the evaluation comprises an evaluation of one or more predefined selection rules that assess whether a given authentication method has a compromised sensitivity.

For example, the predefined selection rules may select an authentication method that is not device-dependent when the one or more predefined risk reasons indicate one or more of that a device associated with the given transaction is compromised or that a device associated with the given transaction is used by a plurality of different users. In another example, the predefined selection rules may select an authentication method that is user-dependent when the predefined risk reasons indicate that a user associated with the given transaction is accessing files in an unusual manner for the associated user.

In another embodiment, the evaluation comprises selecting a first number of the transactions to be authenticated using a first authentication method based on a predefined criteria and selecting at least a second number of the transactions to be authenticated using a second authentication method that has a similar compromised sensitivity as the first authentication method. In yet another embodiment, the evaluation comprises selecting an authentication method based on a learned relationship between a compromised sensitivity of the available authentication method and the risk reasons.

The authentication method selection techniques of the illustrative embodiments overcome one or more of the problems associated with the conventional techniques described previously, and provide improved security by incorporating authentication method selection based on risk reasoning. These and other features and advantages of the present invention will become more readily apparent from the accompanying drawings and the following detailed description.

DETAILED DESCRIPTION

The present invention provides techniques for selecting a suitable authentication method for a given transaction from a pool of available authentication methods in an authentication system, such as an exemplary Adaptive Authentication (AA) system. According to one aspect of the invention, a suitable authentication method to be applied to a given transaction is selected from among the available authentication methods, based on one or more predefined selection rules that evaluate one or more predefined risk reasons to assess whether a given authentication method has a "compromised sensitivity." As used herein, "compromised sensitivity" of an authentication method comprises one or more weaknesses and/or vulnerabilities of the authentication method. In addition, as used herein, the risk reasons associated with a given transaction comprise, for example, the Top N risk reasons that contributed to a risk score that has been assigned to the transaction. For example, if the risk reasons associated with a transaction suggest that the device is compromised, then any authentication method that depends on the particular device will be rendered less effective.

While the present invention is illustrated in the context of an exemplary Adaptive Authentication system, the present invention may be employed in any authentication system where one or more suitable authentication methods must be selected from among a plurality of available authentication methods.

Figure 1:
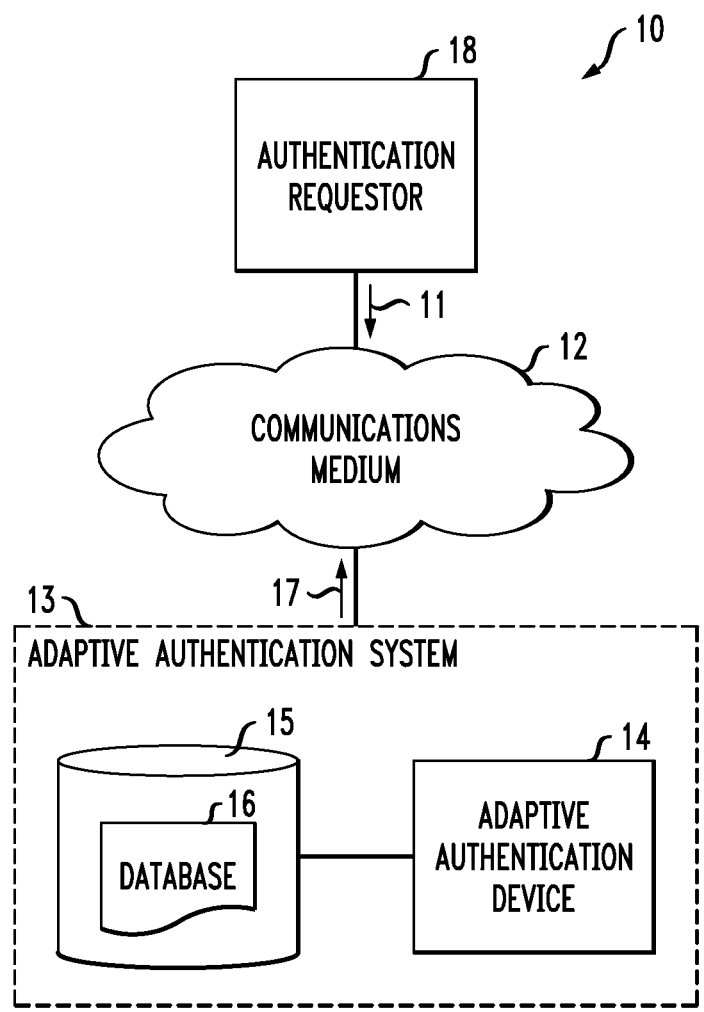
FIG. 1 is a schematic diagram illustrating an electronic environment in which the present invention can be implemented.

FIG. 1 illustrates an exemplary electronic environment 10 for carrying out the improved techniques. Electronic environment 10 includes communications medium 12, authentication requestor 18 and adaptive authentication system 13. As discussed further below, the adaptive authentication system 13 selects a suitable authentication method to be applied to a given transaction from among the available authentication methods, based on one or more predefined selection rules that evaluate one or more predefined risk reasons to assess whether a given authentication method has a "compromised sensitivity."

Communication medium 12 provides connections between adaptive authentication system 13 and authentication requestor 18. The communications medium 12 may implement a variety of protocols such as TCP/IP, UDP, ATM, Ethernet, Fibre Channel, combinations thereof, and the like. Furthermore, the communications medium 12 may include various components (e.g., cables, switches/routers, gateways/bridges, NAS/SAN appliances/nodes, interfaces, etc.). Moreover, the communications medium 12 is capable of having a variety of topologies (e.g., queue manager-and-spoke, ring, backbone, multi drop, point to-point, irregular, combinations thereof, and so on).

Authentication requestor 18 is constructed and arranged to receive, from a user, requests to access data and send, to adaptive authentication system 13, request 11 to authenticate the user. Authentication requestor 18 is further constructed and arranged to receive an adaptive authentication result 17 which indicates whether the user is at high risk of being a fraudulent user.

Request 11 takes the form of a message that includes various facts and their values; such messages are embedded in a payload of a data packet. Request 11 typically includes a username for the user and a timestamp indicating a time.

Adaptive authentication system 13 is constructed and arranged to receive authentication request 11 from authentication requestor 18. Adaptive authentication system 13 is also constructed and arranged to generate adaptive authentication result 17 based on request 11 and a baseline profile of the user, the baseline profile including a history of requests from a user over several previous time windows. Adaptive authentication system 13 is further constructed and arranged to send adaptive authentication result 17 to authentication requestor 18. Adaptive authentication system 13 includes adaptive authentication device 14 and storage device 15.

Storage device 15 is constructed and arranged to store database 16 which contains current and baseline profiles for a user. Database 16 includes a set of entries, each entry of which includes a user identifier, a time period and user data.

Adaptive authentication device 14 is constructed and arranged to perform adaptive authentication operations on request 11 according to the improved techniques and takes the form of a desktop computer, laptop, server or tablet computer. Specifically, adaptive authentication device 14 receives request 11 from authentication requestor 18 and accesses the baseline profile having a user identifier matching the username of request 11. Further detail concerning adaptive authentication device 14 are described below with regard to FIG. 2.

Figure 2:
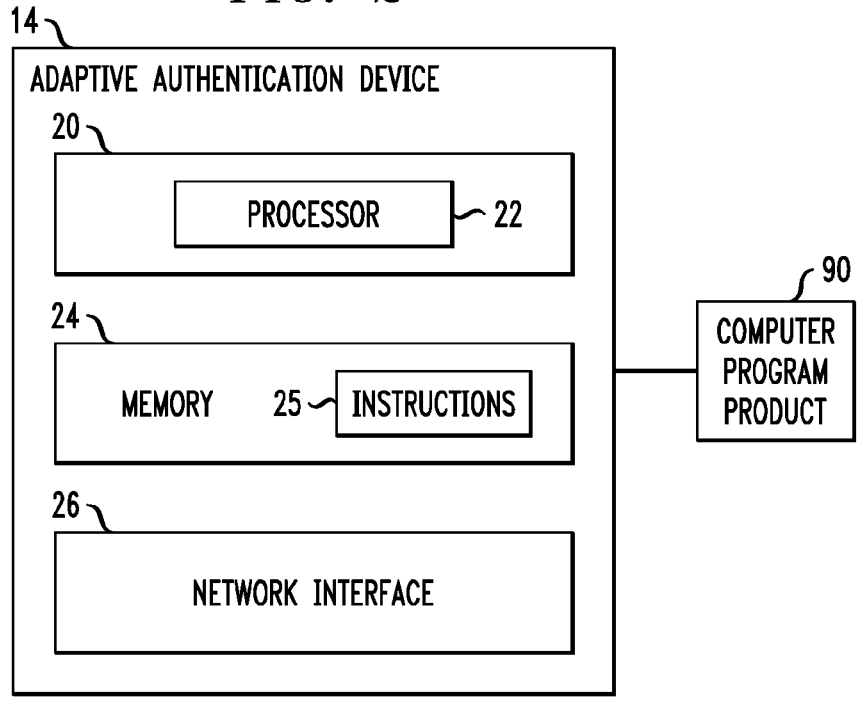
FIG. 2 is a schematic diagram illustrating an exemplary adaptive authentication device within the electronic environment shown in FIG. 1.

FIG. 2 illustrates components of adaptive authentication device 14. Adaptive authentication device 14 includes a controller 20 which in turn includes a processor 22, a memory 24 and a network interface 26.

Memory 24 is configured to store code which includes instructions 25 to process an authentication request from an authentication requestor. Memory 24 is further configured to store data from database 16 and request 11. Memory 24 generally takes the form of, e.g., random access memory, flash memory or a non-volatile memory.

Processor 22 can take the form of, but is not limited to, an Intel or AMD™-based MPU, and can be a single or multi-core running single or multiple threads. Processor 22 is coupled to memory 24 and is configured to execute the instructions 25 stored in memory 24.

Network interface 26 is constructed and arranged to send and receive data over communications medium 12. Specifically, network interface 26 is configured to receive request 11 from and to send adaptive authentication result 17 to authentication requestor 18.

Returning to FIG. 1, adaptive authentication result 17 indicates a likelihood that request 11 is associated with fraudulent activity. Processor 22 generates adaptive authentication result 17 based on fact values of request 11 and user data in database 16, as discussed further below in conjunction with FIGS. 3 through 5.

During operation, authentication requestor 18 sends request 11 to adaptive authentication device 14 via network interface 26. Processor 22 stores data such as the username, fact values and timestamp from request 11 in memory 24. Processor 22 accesses database 16 and performs a lookup operation on the username; that is, processor 22 compares the username to user identifiers in each entry of database 16 and chooses those entries having a user identifier which matches the username.

The lookup operation will result in several entries from database 16, each of whose user identifiers matches the username stored in memory 24 but has user data corresponding to a time interval. The time intervals of the entries of the database that have a user identifier that matches the username of request 11 are distinct and non-overlapping. For example, while one entry has a time interval which ends at the current time and begins at 12 AM the previous Sunday, another entry has a time interval which ends at 11:59 PM the previous Saturday and begins at 12 AM the Sunday prior, and so on.

Processor 22 optionally combines the fact values stored in memory 24 with the fact values in the entry of database 16 that corresponds to the current time interval. For a more detailed discussion of suitable Adaptive Authentication systems, see for example, U.S. patent application Ser. No. 13/246,937, filed Sep. 28, 2011, entitled "Using Baseline Profiles In Adaptive Authentication" and/or United States Patent Application entitled "Techniques for Authenticating Users of Massive Multiplayer Online Role Playing Games Using Adaptive Authentication," each incorporated by reference herein.

Selective Authentication Method Based on Risk Reasoning

Figure 3:
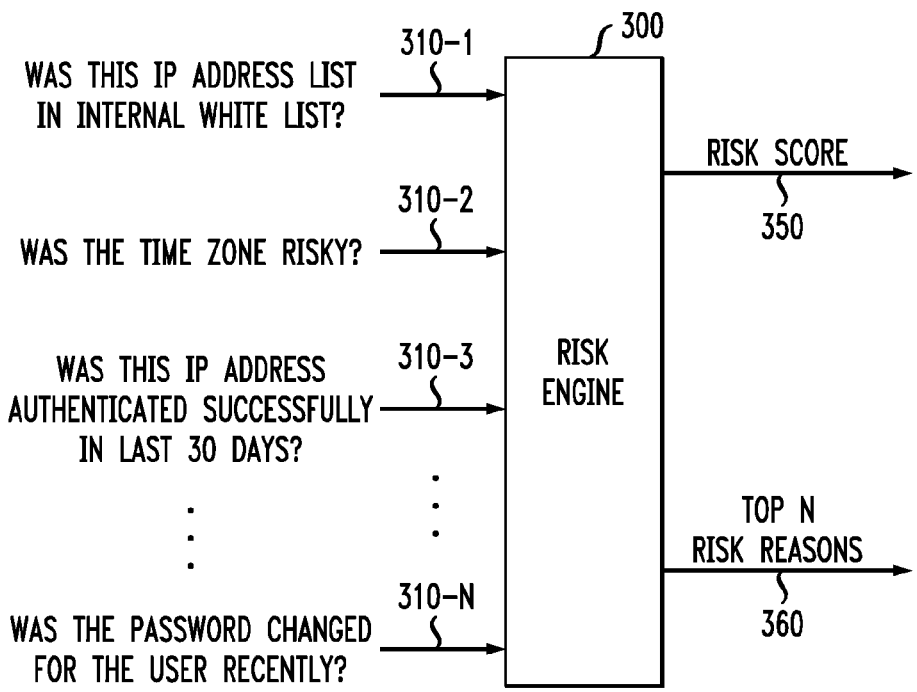
FIG. 3 illustrates an exemplary risk engine 300 evaluating a plurality of categories 310 to assign a risk score 350 to a particular transaction activity.

FIG. 3 illustrates an exemplary risk engine 300 evaluating a plurality of categories 310 to assign a risk score 350 to a particular transaction activity, in a known manner. As shown in FIG. 3, the risk engine 300 evaluates a plurality of inputs 310 in various categories to compute the risk score 350 based on a risk model. In one embodiment, the evaluated inputs 310 can be channel specific, with one or more of the evaluated inputs 310 being specific to a mobile, web and/or Asynchronous Transfer Mode (ATM) channel.

In one exemplary embodiment, the risk engine 300 evaluates the plurality of exemplary inputs 310-1 through 310-N by assigning a weight to each input 310 in a Bayesian approach to generate the risk score 350. The risk engine 300 optionally provides a list 360 of the Top N risk reasons that contributed to the score 350, for example, when the risk score 350 exceeds a predefined criteria.

For a more detailed discussion of an exemplary risk engine 300, see for example, "RSA Risk-Based Authentication," http://www.emc.com/security/rsa-securid/rsa-risk-based-authentication.htm; or RSA ADAPTIVE AUTHENTICATION. A Comprehensive Authentication & Fraud Detection, http://webobjects.cdw.com/webobjects/media/pdf/rsa/Adaptive-Authentication-Datasheet.pdf?cm_sp=RSAShowcase-_-Cat5-_-IPV, each incorporated by reference herein.

Figure 4:
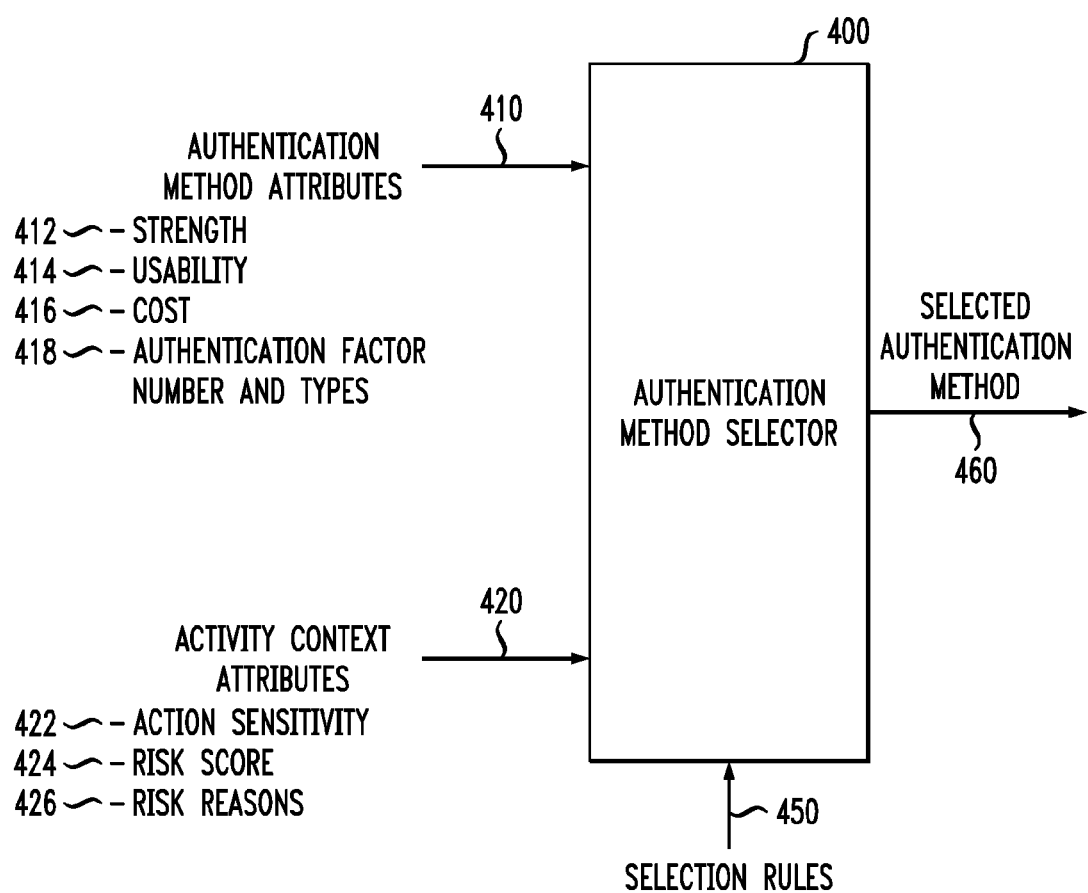
FIG. 4 illustrates an authentication method selector 400 incorporating aspects of the present invention.

FIG. 4 illustrates an authentication method selector 400 incorporating aspects of the present invention. As shown in FIG. 4, the exemplary authentication method selector 400 selects a suitable authentication method based on attributes 410 of the available authentication methods and a context 420 of the activity demanding the authentication.

In one exemplary embodiment, the exemplary authentication method attributes 410 comprise strength 412 (i.e., how strong or effective the method is); usability factor 414 (i.e., how convenient or disturbing the method is); cost 416; and number and types of authentication factors 418. The exemplary attributes 410 of the available authentication methods are fixed for a given authentication method and are used to select a pool of suitable authentication methods for a given application.

In one exemplary embodiment, the exemplary activity context attributes 420 comprise a sensitivity of the action 422; a risk score 424 and risk reasons 426. The sensitivity of the action attribute 422 recognizes that different actions have different sensitivity levels. For example, logging-in to a bank account is less sensitive than performing a money transfer. Similarly, access to the corporate intranet is less sensitive than downloading Merger and Acquisition (M&A) documents. In addition, updating or deleting files is typically more sensitive than reading files.

The risk score attribute 424 characterizes a level of risk associated with the activity. In an Adaptive Authentication (AA) implementation, as well as in many other systems, each transaction or activity has some level of risk and the risk score is assigned to the activity by a risk engine.

As discussed above in conjunction with FIG. 3, the exemplary risk reasons 426 comprise a Top N list of the risk reasons that contributed to the risk score 424. Generally, the risk reasons 426 characterize the attributes of the transaction that are most risky.

In one exemplary implementation, the authentication method selector 400 selects a suitable authentication method 460 based on a strength 412 of the method, according to the risk score 424 of the transaction and the action sensitivity 422. For example, if the activity is very risky (i.e., the risk score 424 exceeds a specified threshold) and sensitive (i.e., the action sensitivity 422 violates one or more predefined criteria), the authentication method selector 400 selects the strongest authentication method. In this exemplary embodiment, the cost attribute 416 and the usability attribute 414 of the available authentication methods are not considered. However, if the risk is mild (i.e., the risk score 424 is below a specified threshold) and not very sensitive (i.e., the action sensitivity 422 satisfies one or more predefined sensitivity criteria), the authentication method selector 400 selects an authentication method based on its cost 416 and usability 414.

According to one aspect of the present invention, the authentication method selector 400 employs the sensitivity 422, risk score 424 and risk reasons 426 of the activity to select a suitable method 460 based on the available authentication methods. The input to the authentication method selector 400 includes a configuration of the authentication methods that are available to select from for each user, as well as the corresponding strength 412, usability factor 414 and cost 416 of each available method. In addition, the authentication method selector 400 processes a classification of the different sensitivity levels 422 of each action (event) that the authentication method selector 400 processes.

According to a further aspect of the present invention, the authentication method selector 400 considers one or more weaknesses and/or vulnerabilities of each authentication method, collectively referred to herein as "compromised sensitivity" of the authentication method. For example, if the risk reasons 426 suggest that the device is compromised, then any authentication method that depends on the particular device will be rendered less effective.

Thus, as shown in FIG. 4, an authentication method selector 400 in accordance with aspects of the invention selects a suitable authentication method 460 to be applied to the transaction from among the available authentication methods, based on one or more predefined selection rules 450 that evaluate one or more predefined risk reasons 426 to assess whether a given authentication method has a "compromised sensitivity."

For example, an exemplary selection rule 450 may specify that if one or more risk reasons 426 indicate that the current device might be compromised or stolen, then the authentication method selector 400 selects an authentication method that is not device-dependent, such as a biometric-based authentication method, over an authentication method that is device-dependent, such as a software token authentication. Likewise, another exemplary selection rule 450 may specify that if one or more risk reasons 426 indicate that a mobile device might be compromised or stolen, or that the location of the mobile device is unexpected for the user, then an SMS out-of-band authentication method would not be employed.

In another variation, an exemplary selection rule 450 may specify that if one or more risk reasons 426 indicate that the same mobile device typically has a number of different users, then the authentication method selector 400 selects an authentication method that is not device-dependent, such as a biometric-based authentication method or a physical token-based authentication method, over an authentication method that is device-dependent, such as a software token authentication on the device.

In yet another variation, an exemplary selection rule 450 may specify that if one or more risk reasons 426 indicate that the user is accessing files in a manner that is unusual for this user (such as accessing files that this user does not typically access, or at peculiar hours for this user, suggesting that an attacker has logged into the account of this user), then the authentication method selector 400 selects an authentication method that is user-specific, such as an SMS out-of-band authentication method on another device of the user or a biometric authentication method.

While a number of exemplary selection rules 450 have been discussed, the present invention can be employed with any selection rules 450 that evaluate one or more predefined risk reasons 426 and select a suitable authentication method based on one or more "compromised sensitivity" considerations associated with the risk reasons 426.

Figure 5:
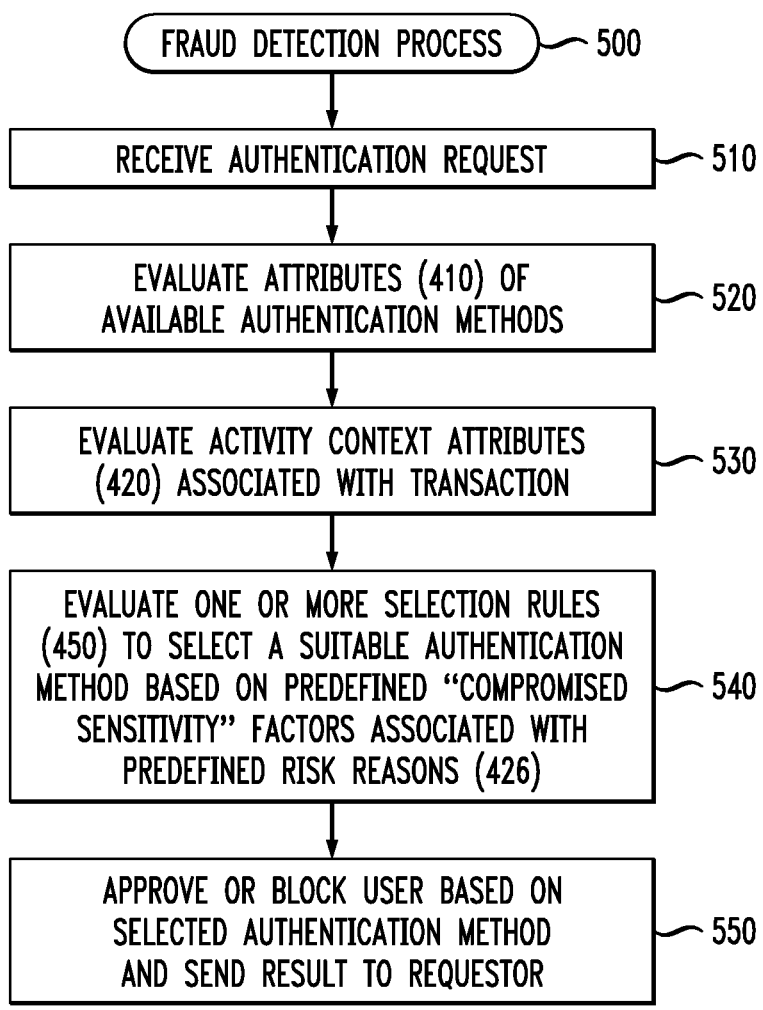
FIG. 5 is a flow chart describing an exemplary implementation of an fraud detection process that incorporates aspects of the present invention.

FIG. 5 is a flow chart describing an exemplary implementation of a fraud detection process 500 that incorporates aspects of the present invention. As shown in FIG. 5, the exemplary fraud detection process 500 initially receives an authentication request during step 510 from the authentication requestor 18. The exemplary fraud detection process 500 then evaluates the attributes 410 of the available authentication methods during step 520 and evaluates the activity context attributes 420 associated with the transaction during step 530.

Such operations may involve analyzing a user's attributes (e.g., the user's device address, ISP address, location, etc.). Additionally, such operations may involve analyzing certain behavior characteristics of the user's sessions (e.g., a comparison of time of day, length of session, purchase habits, and other activity). Accordingly, the adaptive authentication device 14 is able to evaluate potential risks of fraud (i.e., generate risk scores 350 and risk reasons 360) and provide input back to the requester 18 to allow the requester 18 to take action (e.g., contact the user, temporarily deny/disable the user's account, etc.).

During step 540, the fraud detection process 500 evaluates one or more selection rules 450 to select a suitable authentication method based on one or more predefined "compromised sensitivity" factors associated with predefined risk reasons 426.

The adaptive authentication device 14 optionally performs additional risk-based authentication operations during step 540, as specified in the selection rules 450. For example, the adaptive authentication device 14 can issue an out-of-band challenge to the user through an out-of-band device (not shown). The out-of-band challenge requires that the user provide an out-of-band response using the out-of-band device (e.g., a cell phone, email, SMS, etc.). In some arrangements, the challenge is a user specific question that only the user should be able to answer.

Next, the adaptive authentication device 14 makes a decision during step 550 whether to approve or block the user, based on the selected authentication method, and sends the result of that decision to the requestor 18. Upon receipt of the decision, the requester 18 either approves or blocks access. Such operation may include the creation of a ticket for follow-up by a fraud department.

Additionally, the adaptive authentication device 14 updates its records in the user database 16 with data gathered during the user login attempt. Such information may include identification information of a new user device, a new location, a new access time, etc. Generally, the answer to the challenge is typically applied to an adapting algorithm and the classifier can be modified using supervised learning techniques to fit the new information.

While the exemplary embodiments described herein select an authentication method from among a plurality of available authentication methods based on an evaluation of one or more selection rules 450, other forms of evaluating authentication methods are also within the scope of the present invention, as would be apparent to a person of ordinary skill in the art. For example, in one variation, the evaluation comprises selecting a first number of transactions to be authenticated using a first authentication method based on a predefined criteria (e.g., Top N risky transactions) and selecting at least a second number of the transactions (such as the remaining transactions) to be authenticated using a second authentication method that has a similar "compromised sensitivity" as the first authentication method. For example, from a cost/control point of view, a maximum number of times to use a given "costly" authentication method can be specified. In this manner, a given "costly" authentication method, such as an out-of-band SMS verification, can be limited to only the Top N risky transactions per day (or another specified time period). One or more alternative authentication methods can be applied to the remaining transactions.

In another variation, the evaluation comprises selecting an authentication method based on a learned relationship between a "compromised sensitivity" of the available authentication methods and the risk reasons. This can be done, for example, in a Bayesian framework. For example, the ratio of failed authentications for a given set of risk reasons can be determined for the various available authentication methods. Once this ratio is known, and given a set of risk reasons, an authentication method with the highest probability not to fail can be selected.

While various embodiments of the invention have been particularly shown and described, it will be understood by those skilled in the art that various changes in form and details may be made therein without departing from the spirit and scope of the invention as defined by the appended claims.

Furthermore, it should be understood that some embodiments are directed to an adaptive authentication device 14 that selects an authentication method from among a plurality of available authentication methods. Some embodiments are directed to a system that processes an authentication request from an authentication requestor. Some embodiments are directed to a method of processing an authentication request from an authentication requestor. Also, some embodiments are directed to a computer program product that enables computer logic to process an authentication request from an authentication requestor.

In some arrangements, adaptive authentication device 14 is implemented by a set of processors or other types of control/processing circuitry running software. In such arrangements, the software instructions can be delivered to adaptive authentication device 14 in the form of a computer program product (illustrated generally by code for computer program 90 stored within memory 24 in FIG. 2) having a computer readable storage medium which stores the instructions in a non-volatile manner. Alternative examples of suitable computer readable storage media include tangible articles of manufacture and apparatus such as CD-ROM, flash memory, disk memory, tape memory, and the like.

As mentioned previously herein, the above-described embodiments of the invention are presented by way of illustrative example only. Numerous variations and other alternative embodiments may be used.

The term "authentication information" as used herein is intended to include passwords, passcodes, answers to life questions, or other authentication credentials, or values derived from such authentication credentials, or more generally any other information that a user may be required to submit in order to obtain access to an access-controlled application. Although the illustrative embodiments are described herein in the context of adaptive authentication, it is to be appreciated that the invention is more broadly applicable to any other type of authentication system.

The illustrative embodiments of the invention as described herein provide an improved authentication of users of authentication systems. Advantageously, the illustrative embodiments do not require changes to existing communication protocols. It is therefore transparent to both existing applications and communication protocols. The described techniques may be used with security tokens that generate one-time passwords or other types of authentication information, regardless of whether such tokens are connectable to the user device.

It should again be emphasized that the particular authentication techniques described above are provided by way of illustration, and should not be construed as limiting the present invention to any specific embodiment or group of embodiments. For example, as previously noted, the described embodiments may be adapted in a straightforward manner to operate with other types of time authentication information and other types of access-controlled resources. Also, the particular configuration of system elements shown in the figures and their interactions may be varied in other embodiments. Moreover, the various simplifying assumptions made above in the course of describing the illustrative embodiments should also be viewed as exemplary rather than as requirements or limitations of the invention. Numerous alternative embodiments within the scope of the appended claims will be readily apparent to those skilled in the art.

What is claimed is:

1. A method for processing an authentication request from an authentication requestor for a given transaction, the method comprising:
   receiving, using at least one processor, the authentication request from said authentication requester; and
   selecting, using at least one processor, an authentication method to be applied to said given transaction from among a plurality of available authentication methods stored in at least one memory based on an evaluation by said at least one processor of a context of the given transaction and attributes of said available authentication methods, wherein said attributes of said available authentication methods used for said selection of said authentication method are fixed for each given available authentication method, wherein said attributes of said available authentication methods comprise one or more of a strength of a given available authentication method, a usability of said given available authentication method, a cost of a given available authentication method, and a number and types of authentication factors of said given available authentication method.

2. The method of claim 1, wherein said context of the given transaction comprises one or more predefined risk reasons associated with a said given transaction, wherein said one or more predefined risk reasons comprise a set of risk reasons that contribute to a risk score that has been assigned to the given transaction.

3. The method of claim 1, wherein said evaluation comprises selecting a first number of said transactions to be authenticated using a first authentication method based on a predefined criteria and selecting at least a second number of said transactions to be authenticated using a second authentication method that has a similar compromised sensitivity as said first authentication method.

4. The method of claim 1, wherein said evaluation comprises selecting an authentication method based on a learned relationship between a compromised sensitivity of said available authentication methods and one or more risk reasons associated with a said given transaction, wherein said one or more risk reasons comprise a set of risk reasons that contribute to a risk score that has been assigned to the given transaction.

5. The method of claim 1, wherein said evaluation comprises an evaluation of one or more predefined selection rules that assess whether a given authentication method from among said plurality of available authentication methods has a compromised sensitivity.

6. The method of claim 5, wherein said compromised sensitivity of a given authentication method comprises one or more of a weakness and a vulnerability of the given authentication method.

7. The method of claim 5, wherein said one or more predefined selection rules selects an authentication method that does not depend on characteristics of a device associated with said given transaction when said one or more predefined risk reasons indicate that said device associated with said given transaction is compromised.

8. The method of claim 5, wherein said one or more predefined selection rules selects an authentication method that does not depend on characteristics of a device associated with said given transaction when said one or more predefined risk reasons indicate that said device associated with said given transaction is used by a plurality of different users.

9. The method of claim 5, wherein said one or more predefined selection rules selects an authentication method that evaluates characteristics of a user associated with said given transaction when said one or more predefined risk reasons indicate that said user associated with said given transaction is accessing files in an unusual manner for the associated user.

10. A computer program product comprising a tangible machine-readable storage medium having encoded therein executable code of one or more software programs, wherein the one or more software programs when executed perform the steps of the method of claim 1.

11. The method of claim 1, wherein said context of the given transaction comprises one or more of a sensitivity of the given transaction, a risk score of the given transaction and risk reasons of the given transaction, wherein said risk reasons of the given transaction comprise a set of reasons that contribute to said risk score of the given transaction.

12. An apparatus for processing an authentication request from an authentication requestor for a given transaction, the apparatus comprising:
   a memory; and
   at least one hardware device, coupled to the memory, operative to:
   receive the authentication request from said authentication requester; and
   select an authentication method to be applied to said given transaction from among a plurality of available authentication methods based on an evaluation of a context of the given transaction and attributes of said available authentication methods, wherein said attributes of said available authentication methods used for said selection of said authentication method are fixed for each given available authentication method, wherein said attributes of said available authentication methods comprise one or more of a strength of a given available authentication method, a usability of said given available authentication method, a cost of a given available authentication method, and a number and types of authentication factors of said given available authentication method.

13. The apparatus of claim 12, wherein said context of the given transaction comprises one or more predefined risk reasons associated with a said given transaction, wherein said one or more predefined risk reasons comprise a set of risk reasons that contribute to a risk score that has been assigned to the given transaction.

14. The apparatus of claim 12, wherein said evaluation comprises selecting a first number of said transactions to be authenticated using a first authentication method based on a predefined criteria and selecting at least a second number of said transactions to be authenticated using a second authentication method that has a similar compromised sensitivity as said first authentication method.

15. The apparatus of claim 12, wherein said evaluation comprises selecting an authentication method based on a learned relationship between a compromised sensitivity of said available authentication method and one or more risk reasons associated with a said given transaction, wherein said one or more risk reasons comprise a set of risk reasons that contribute to a risk score that has been assigned to the given transaction.

16. The apparatus of claim 12, wherein said evaluation comprises an evaluation of one or more predefined selection rules that assess whether a given authentication method from among said plurality of available authentication methods has a compromised sensitivity.

17. The apparatus of claim 16, wherein said one or more predefined selection rules selects an authentication method that does not depend on characteristics of a device associated with said given transaction when said one or more predefined risk reasons indicate one or more of that said device associated with said given transaction is compromised and that said device associated with said given transaction is used by a plurality of different users.

18. The apparatus of claim 16, wherein said one or more predefined selection rules selects an authentication method that evaluates characteristics of a user associated with said given transaction when said one or more predefined risk reasons indicate that said user associated with said given transaction is accessing files in an unusual manner for the associated user.

19. The apparatus of claim 16, wherein said compromised sensitivity of a given authentication method comprises one or more of a weakness and a vulnerability of the given authentication method.

20. The apparatus of claim 12, wherein said context of the given transaction comprises one or more of a sensitivity of the given transaction, a risk score of the given transaction and risk reasons of the given transaction, wherein said risk reasons of the given transaction comprise a set of reasons that contribute to said risk score of the given transaction.

\* \* \* \* \*